United States Patent
Kim

(10) Patent No.: US 7,236,800 B2
(45) Date of Patent: Jun. 26, 2007

(54) SYSTEM AND METHOD FOR GENERATING MESSAGE REFERENCE NUMBER FOR A MOBILE COMMUNICATION STATION

(75) Inventor: Hyun-Sung Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 10/988,731

(22) Filed: Nov. 15, 2004

(65) Prior Publication Data

US 2005/0107101 A1    May 19, 2005

(30) Foreign Application Priority Data

Nov. 15, 2003   (KR) ...................... 10-2003-0080861

(51) Int. Cl.
*H04Q 7/20* (2006.01)
(52) U.S. Cl. .................... 455/466; 455/412.1
(58) Field of Classification Search ............... 455/466, 455/412.1, 414.1, 426.1; 370/392, 471
See application file for complete search history.

(56) References Cited

U.S. PATENT DOCUMENTS

| | | | |
|---|---|---|---|
| 5,590,277 A * | 12/1996 | Fuchs et al. ................... 714/38 |
| 6,185,208 B1 * | 2/2001 | Liao ........................... 370/392 |
| 6,448,885 B1 * | 9/2002 | Abe et al. ................... 340/7.58 |
| 2001/0041578 A1 | 11/2001 | Na .............................. 455/466 |
| 2002/0036880 A1 | 3/2002 | Kanamaru et al. .......... 361/103 |
| 2003/0163580 A1 | 8/2003 | Lee ............................. 709/230 |

FOREIGN PATENT DOCUMENTS

| | | |
|---|---|---|
| EP | 0 989 704 A | 3/2000 |
| WO | WO 00/74343 A | 12/2000 |
| WO | WO 03/041025 A | 5/2003 |

* cited by examiner

*Primary Examiner*—CongVan Tran
(74) *Attorney, Agent, or Firm*—Lee, Hong, Degerman, Kang & Schmadeka

(57) ABSTRACT

A system and method is disclosed is capable of receiving messages from a mobile communication system. The system generates a reference number for a received message comprising a terminal, a reference number table, and comparator. The terminal communicates a received message having an allocated reference number. A reference number table stores messages according to reference number. A comparison is performed at the terminal for comparing the allocated reference number to a reference number of a previously stored message. A new reference number is generated if the allocated reference number is the same as the reference number of the previously stored message. The system also provides means for storing the allocated reference number and the new reference number in the reference number table for the received message.

30 Claims, 4 Drawing Sheets

|  | M₁ | M₂ | M₃ |
|---|---|---|---|
| OCTET 1 | 123 | 123 | 123 |
| OCTET 2 | 3 | 3 | 3 |
| OCTET 3 | 1 | 2 | 3 |

| MESSAGE IDENTIFIER | REFERENCE NUMBER | NEW REFERENCE NUMBER |
|---|---|---|
| # 1 | 111 | 121 |
| # 2 | 123 | 134 |
| # 3 | 123 | 122 |
| ⋮ | ⋮ | ⋮ |

SYSTEM AND METHOD FOR GENERATING MESSAGE REFERENCE NUMBER FOR A MOBILE COMMUNICATION STATION

CROSS-REFERENCE TO RELATED APPLICATIONS

Pursuant to 35 U.S.C. § 119(a), this application claims the benefit of earlier filing date and right of priority to Korean Application No. 10-2003-80861, filed on Nov. 15, 2003, the contents of which are hereby incorporated by reference herein in their entirety.

BACKGROUND OF THE INVENTION

1. Field of the Invention

The present invention relates to a message service of a mobile communication terminal, and particularly, to a system and method for generating a message reference number of a mobile communication terminal.

2. Description of the Related Art

A mobile terminal provides not only voice, but more recently data communication and multimedia services. One type of data communication service, a short message service, transmits a text message through a short message center (SMSC) to a user. An enhanced message service (EMS) may transmit the text message with attachments. The attachments may be pictures, animations, photos, melodies, and the like. These attachments may be provided by an EMS terminal. A single message from an EMS terminal may contain only a limited number of bytes of data. To increase the capacity of an EMS terminal, multiple data bytes are concatenated as one message utilizing a concatenation function.

The data contained in a concatenated message has a value associated with a reference number. For example, if the reference number is 8 bits, then the data has a value between 0 to 255. In another example, if the reference number is 16 bits, then the data has a value between 0 to 65335. Upon transmission of a mobile originated (MO) message, a mobile originated mobile station (MOMS) assigns reference numbers to messages for concatenation. A mobile terminated mobile station (MTMS) receiving the messages concatenates the messages having the reference numbers into one message.

A reference number contained in a message of the conventional mobile terminal has a limited number of bytes. In one example, a conventional mobile terminal is limited to communicating messages of 8 to 16 bytes. When a mobile terminal user exchanges a message with multiple users, the reference numbers are repeatedly used. The MTMS may receive a message having the same reference number as that of a previously received and stored message. Accordingly, the received message and the previously stored message having the same reference number, even if stored separately, are not concatenated to avoid a collision of reference numbers. The collision would result in a data error.

There is a need for improvements in communicating messages within a mobile communication system that addresses the above problems and provides additional advantages.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to provide a system and method for generating a reference number, such as an allocated reference number, for a message of a mobile terminal to prevent data collision errors due to overlapping reference numbers. The reference number is generated when a newly received message has a reference number that is the same as that of a previously stored message.

In one embodiment, a system for generating a message reference number implementing a message service function comprising a terminal for communicating a received message having an allocated reference number, a reference number table, and a comparator electrically coupled to the terminal for comparing the allocated reference number to a reference number of a previously stored message. The embodiment further comprises a means for generating a new reference number if the allocated reference number is the same as a reference number of a previously stored message. The embodiment further comprises a means for storing the allocated reference number and the new reference number in the reference number table for the received message.

In yet another embodiment, the system further comprises a means for extracting the allocated reference number. In yet another embodiment, the system further comprises a means for extracting the allocated reference number if the received message is a concatenated message.

In yet another embodiment, the reference number table has a means for registering the allocated reference number for comparison with a registered number for a previously stored message.

The reference number table further comprises a data field structure having a message identifier field for identifying the order that the received message was received. The reference number table further comprises a data field structure having a reference number field for storing the allocated reference number. The reference number table further comprises a data field structure having a new reference number field for storing the new reference number if the allocated reference number is the same as the reference number of a previously stored message.

In yet another embodiment, the allocated reference number is allocated by a mobile originated mobile station. In another embodiment, the new reference number of the received message is allocated by a mobile terminated mobile station.

In yet another embodiment, a method is disclosed for generating a reference number for a message of a mobile communication terminal comprising extracting a reference number allocated to a received message, determining whether another message having a reference number that is the same as the extracted reference number exists; and, generating a new reference number for the received message if another message having the same reference number exists, and registering the new reference number in a reference number table.

The embodiment further comprises determining if the received message is a concatenated message, then extracting the reference number.

The embodiment further comprises notifying a user of the message reception.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to efficiently transmitting messages by increasing data capacity and preventing data collisions between terminals in a mobile communication system. The method and system is capable of detecting and discerning concatenated messages. Although the invention is illustrated with respect to a mobile terminal using an enhanced message service, it is contemplated that the invention may be utilized anytime it is desired for efficiently transmitting or receiving signals from one location to another location.

The present invention provides a solution for conventional mobile communication terminals when a received message (reception message) has a reference number that is the same as a previously received message. The present invention prevents the loss of data due to a received message being copied over a stored message with the same reference number. The present invention generates a new reference number for a received message if the received message has the same reference number as a stored message at a terminal. The reference numbers of messages are stored according to reference number in a reference number table. If the received message has the same reference number as the stored message, the reference number of the received message and the new reference number are stored in the reference number table. The reference numbers are registered by the system of the present invention.

Figures 1, 2:
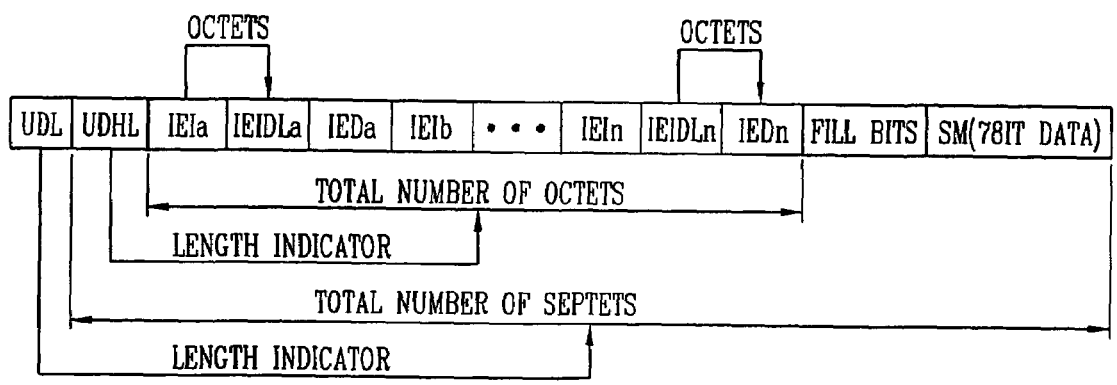
FIG. 1 is a data field structure for a message from an enhanced message service.
FIG. 2 is a table displaying an informational element data structure of FIG. 1.

Referring to FIG. 1, an enhanced message service (EMS) utilizes a field structure comprising a user data length (UDL), a user data header length (UDHL), an information element identifier (IEI), an information element identifier data length (IEIDL), and information element data (IED). The UDHL field defines the entire length of the user data field. The UDHL field expresses the number of octets in a User Data Header field as an integer and the UDHL field. However, the fill bits are not included in the number of octets. The information element (IEIDL) field expresses the number of octets related to an information element data (IED) field as an integer. The IEIDL field itself is not included in a count value.

An enhanced message service (EMS) sends a message. The message is divided into two messages. A concatenated short message having a 8-bit reference number and a concatenated short message having a 16-bit reference number. As for the concatenated short message having the 8-bit reference number, the values for the fields are IEI=0, IEIDL=3, and the IED octet includes, in this example, octets 1, 2 and 3. Octet 1 comprises a concatenated short message 8-bit reference number. Octet 2 comprises the maximum number of short messages in the concatenated short message. Octet 3 comprises the sequence number of the current short message.

As for the concatenated short message having the 16-bit reference number, the values for the fields are the IEI=08, the IEIDL=4, and the IED octet includes, in this example, octets 1, 2, 3, and 4. Octets 1 and 2 are concatenated short messages for 16-bit reference numbers. Octet 3 is the maximum number of short messages in the concatenated short message. Octet 4 is the sequence number of the current short message.

Referring to FIG. 2, an embodiment of the IED octet (using 8-bit reference number) is shown. A concatenated message is received. The concatenated message comprises multiple messages, for example, designated M1, M2, and M3. Referring to M1, octet 1 indicates a reference number of '123', octet 2 indicates the maximum number of short messages is '3', and octet 3 indicates a sequence number of the current short message is '1'. Referring to M2, octet 1 indicates a reference number '123', octet 2 indicates the maximum number of short messages is '3', and octet 3 indicates a sequence number of the current short message is '2'. Referring to M3, octet 1 ='123', octet 2='3', and octet 3='3'.

Figure 3:
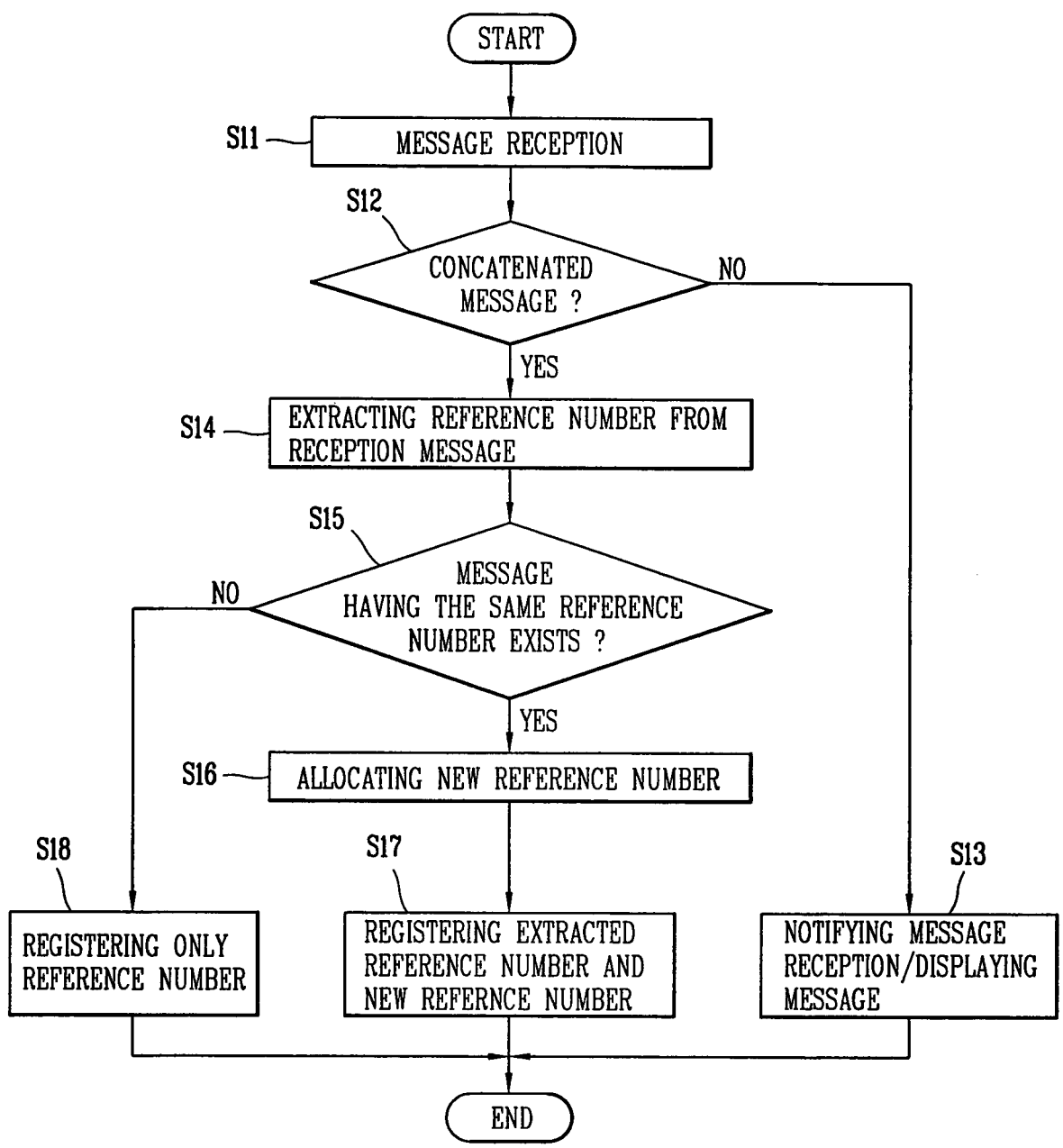
FIG. 3 is a flow chart generating a reference number for a message in accordance with an embodiment of the present invention.

Referring to FIG. 3, a received message is received (S11). A terminal determines whether the received message is a concatenated message (S12). If the received message is not a concatenated message, but a multimedia message service (MMS) or a long message service (LMS), the terminal notifies a user that the message is received (S13). For notification purpose, the message is outputted on a display unit, in this example, according to a user input command. The user input command may be through the key buttons of the terminal.

If the received message is a concatenated message, the terminal extracts a reference number from the received message (S14). The terminal determines whether another message, such as a stored or temporarily stored message, has a same reference number (S15). In this example, the reference number of the received message is compared to a previously stored message, such as a concatenated message located in a reference number table. The reference number table is located, in this example, at the terminal. Namely, the reference number of the concatenated message received by the terminal is stored in the reference number table.

If a received message has the same reference number as the (extracted) reference number already stored in the terminal, the terminal generates a new reference number (S16). The new reference number, in one example, replaces the reference number of the received message. In yet another embodiment, the reference number (extracted from the received message) and the new reference number are stored together in the reference number table (S17).

If the extracted reference number does not exist at the terminal, the terminal stores only the extracted reference number in the reference number table (S18).

Figures 4, 5:
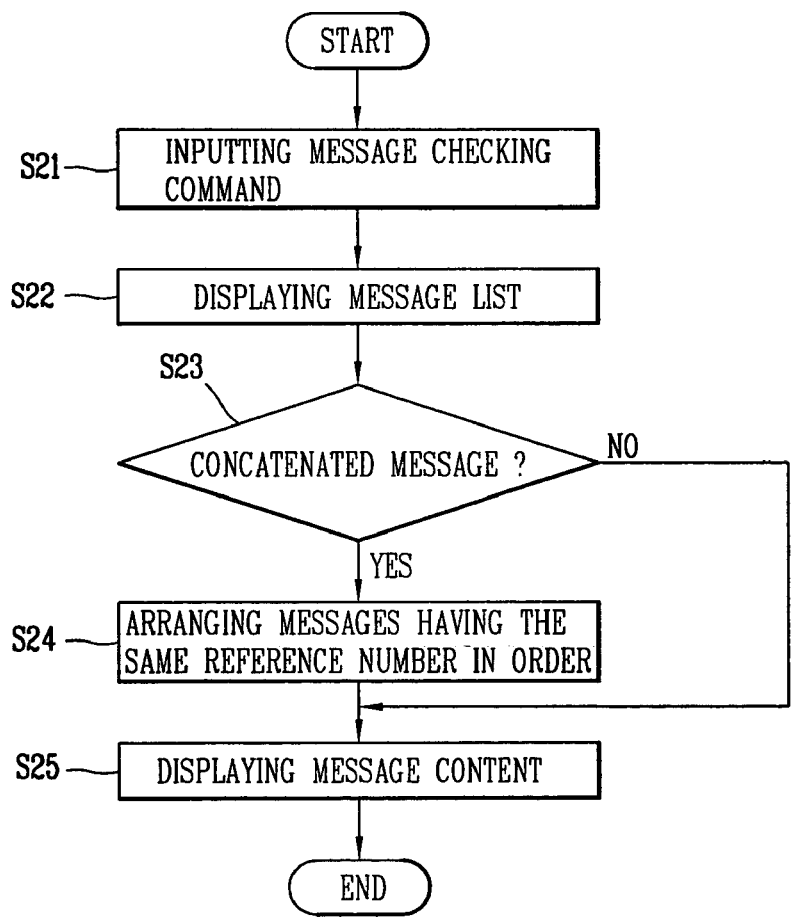
FIG. 4 is a table displaying a reference number table in accordance with an embodiment of the present invention.
FIG. 5 is a flow chart displaying a method for checking for a stored message in a terminal in accordance with an embodiment of the present invention.

Referring to FIG. 4, the reference number table, for example, is comprised of fields comprising a message identifier, a reference number, and a new reference number. The message identifier allocates or generates an identifier according to the order that the concatenated messages arrive at the terminal. The reference number is stored for each concatenated message from the mobile originated mobile station (MOMS). The new reference number is allocated or generated for each concatenated message by the mobile terminated mobile station (MTMS).

The reference number associated with message identifier #3 is '123'. The terminal searches the reference number table. The terminal determines there is a concatenated message (another message) having a reference number '123' corresponding to message identifier #2. The terminal generates or allocates a new reference number '122' for the concatenated message corresponding to the message identifier #3. The reference number '123' and the new reference number '122' are both stored for message identifier #3 in the reference number table.

In other words, if a received message has an identical reference number as a reference number as that of a concatenated message already existing, the terminal generates a new reference number and stores the two reference numbers for identifying the received message.

Referring to FIG. 5, a method of the present invention is disclosed. A user inputs a command checking a message stored in a terminal (S21). The terminal displays a message list on a display unit (S22). The user selects a message from the message list and the terminal determines whether the corresponding message is a concatenated message (S23).

If the message is a concatenated message, all messages within the concatenated message having the same reference number as that of the corresponding message are arranged in the order of their sequence numbers (S24). The contents of the concatenated message are provided to the display unit (S25). However, if the message is not a concatenated message, the corresponding message is coded and displayed on the display unit (S25).

If the reception terminal provides a newly allocated reference number to the concatenated message, the concatenated messages within the message are arranged according to an assigned sequence number. The assigned sequence number is based on the new reference number.

The following are examples including a mobile communication device using the system and the method of the present invention.

Figure 6:
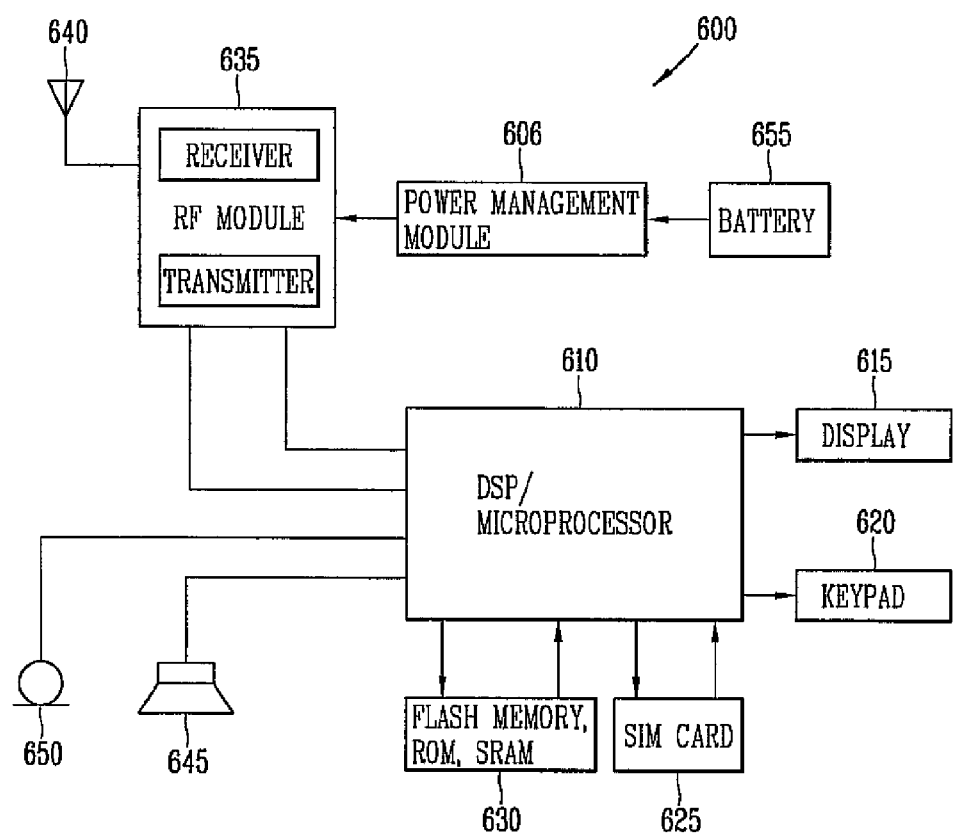
FIG. 6 is a block diagram illustrating a mobile communication device incorporating the systems and method of the present invention.

Referring to FIG. 6, the mobile communication device 600 comprises a processing unit 610 such as a microprocessor or digital signal processor, an RF module 635, a power management module 606, an antenna 640, a battery 655, a display 615, a keypad 620, a storage unit 630 such as flash memory, ROM or SRAM, a speaker 645 and a microphone 650.

A user enters instructional information, for example, by pushing the buttons of a keypad 620 or by voice activation using the microphone 650. The processing unit 610 receives and processes the instructional information to perform the appropriate function. Operational data may be retrieved from the storage unit 630 to perform the function. Furthermore, the processing unit 610 may display the instructional and operational information on the display 615 for the user's reference and convenience.

The processing unit 610 issues instructional information to the RF module 635, to initiate communication, for example, transmit radio signals comprising voice communication data. The RF module 635 comprises a receiver and a transmitter to receive and transmit radio signals. The antenna 640 facilitates the transmission and reception of radio signals. Upon receive radio signals, the RF module 635 may forward and convert the signals to baseband frequency for processing by the processing unit 610. The processed signals would be transformed into audible or readable information outputted via the speaker 645.

The processing unit 610 performs the methods and provides the systems as illustrated in FIGS. 2–5. As an example, the processing unit 610 adapted to generating a reference number for a message of a mobile communication terminal, comprising extracting a reference number associated with a received message, determining whether another message having a reference number that is the same as the extracted reference number exists, generating a new reference number for the received message if the another message having the same reference number exists, and registering the new reference number in a reference number table. Other features, as described above in FIGS. 2–5, may be incorporated as well into the processing unit 610.

The processing unit 610 stores the messages received from and messages transmitted to other users in the storage unit 630, receive a conditional request for message input by the user, process the conditional request to read data corresponding to the conditional request from the storage unit. The processing unit 610 outputs the message data to the display unit 615. The storage unit 630 is adapted to store message data of the messages both received and transmitted.

It will be apparent to one skilled in the art that the preferred embodiments of the present invention can be readily implemented using, for example, the processing unit 610 (of FIG. 6) or other data or digital processing device, either alone or in combination with external support logic.

Although the present invention is described in the context of a consumer product such as a MP3 player, the present invention may also be used in any wired or wireless communication systems using mobile devices, such as PDAs and laptop computers equipped with wired and wireless wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, system or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

Further, with respect to the claims, it should be understood that any of the claims described below may be combined for the purposes of the present invention.

The foregoing embodiments and advantages are merely exemplary and are not to be construed as limiting the present invention. The present teaching can be readily applied to other types of systems. The description of the present invention is intended to be illustrative, and not to limit the scope of the claims. Many alternatives, modifications, and variations will be apparent to those skilled in the art. Accordingly, the invention is not limited to the precise embodiments described in detail herein above.

What is claimed is:

1. A system for generating a reference number for a received message in a mobile communication system, the system comprising:
    a terminal for communicating a received message having an allocated reference number;
    a reference number table stored at the terminal;
    means for comparing the allocated reference number to a reference number of a message previously stored at the terminal;
    means for generating a new reference number if the allocated reference number is the same as the reference number of the previously stored message; and
    means for storing the allocated reference number and the new reference number in the reference number table for the received message,
    wherein the allocated reference number and the new reference number are linked to each other.

2. The system of claim 1, further comprising means for extracting the allocated reference number to determine if the received message is a concatenated message.

3. The system of claim 1, further comprising means for extracting the allocated reference number if the received message is a concatenated message.

4. The system of claim 1, wherein the reference number table has means for registering the allocated reference number for comparison with a registered number for the previously stored message.

5. The system of claim 1, wherein the reference number table comprises a field structure having a message identifier field for identifying the order that the received message was received.

6. The system of claim 1, wherein the reference number table comprises a field structure having a reference number field for storing the allocated reference number.

7. The system of claim 1, wherein the reference number table comprises a data field structure having a new reference number field for storing the new reference number if determined that the allocated reference number is the same as the reference number of the previously stored message.

8. The system of claim 1, wherein the allocated reference number is allocated by a mobile originated mobile station.

9. The system of claim 1, wherein the new reference number of the received message is allocated by a mobile terminated mobile station.

10. A method for generating a reference number for a message of a mobile communication terminal, the method comprising:
    extracting a reference number associated with a received message;
    determining whether another message having a reference number that is the same as the extracted reference number exists in the mobile communication terminal;
    generating a new reference number for the received message if the another message having the same reference number exists; and
    registering the new reference number in a reference number table.

11. The method of claim 10, extracting a reference number further comprises determining if the received message is a concatenated message.

12. The method of claim 10, further comprises notifying a user of the message reception.

13. The method of claim 10, further comprises displaying the received message if the received message is not a concatenated message.

14. The method of claim 10, further comprises comparing the reference number extracted from the received message with a reference number registered in the reference number table.

15. The method of claim 10, registering the reference number in the reference number table.

16. The method of claim 10, further comprising providing by a mobile originated mobile station the allocated reference number.

17. The method of claim 10, further comprising providing by a mobile terminated mobile station the allocated reference number.

18. The method of claim 10, further comprising registering the extracted reference number together with the new reference number in the reference number table sequentially according to the new reference number.

19. A method in a mobile communication system for generating a reference number when the allocated reference number of the message that is communicated is the same, the method comprising:
    determining whether a message is a concatenated message;
    extracting a reference number if the message is the concatenated message;
    searching a mobile communication terminal for a prior message having a reference number that is the same as the extracted reference number;

allocating a new reference number to the message if the prior message having the same reference number exists; and registering the extracted reference number and the newly allocated reference number.

20. The method of claim 19, further comprising notifying a user if the message is not a concatenated message.

21. The method of claim 19, further comprising displaying the message for a user if the message is not a concatenated message.

22. The method of claim 19, further comprising storing at least one of the extracted reference number and the new reference number in the reference number table.

23. The method of claim 19, further comprising storing the allocated reference number and the new reference number in the reference table.

24. The method of claim 19, further comprising allocating by a mobile originated mobile station the reference number of the message.

25. The method of claim 19, further comprising allocating by a mobile terminated mobile station the reference number of the message.

26. A mobile communication device for managing messages received from and transmitted to another user by a user of the mobile communication device, the mobile communication device comprising:

an RF module comprising a transmitter to send the transmitted messages from a user and a receiver for receiving messages from another user; and a processing unit adapted for:

determining whether a message is a concatenated message;

extracting a reference number if the message is the concatenated message;

searching for a prior message having a reference number that is the same as the extracted reference number;

allocating a new reference number to the message if the prior message having the same reference number exists; and registering the extracted reference number and the newly allocated reference number.

27. The device of claim 26, wherein the processing unit is further adapted for notifying a user if the message is not a concatenated message.

28. The device of claim 26, wherein the processing unit is further adapted for displaying the message for a user if the message is not a concatenated message.

29. The device of claim 26, wherein the processing unit is further adapted for storing at least one of the extracted reference number and the new reference number in the reference number table.

30. The device of claim 26, wherein the processing unit is further adapted for storing the allocated reference number and the new reference number in the reference table.

* * * * *